US008096293B2

(12) United States Patent
Hoellenriegel et al.

(10) Patent No.: US 8,096,293 B2
(45) Date of Patent: Jan. 17, 2012

(54) WATER-HEATING SYSTEM (75) Inventors: Wolfgang Hoellenriegel, Biedenkopf (DE); Manfred Roth, Dautphetal (DE)

(73) Assignee: Roth Werke GmbH, Dautphetal (DE)

( * ) Notice: Subject to any disclaimer, the term of this patent is extended or adjusted under 35 U.S.C. 154(b) by 314 days.

(21) Appl. No.: 12/397,382

(22) Filed: Mar. 4, 2009

(65) Prior Publication Data

US 2009/0223509 A1 Sep. 10, 2009

(30) Foreign Application Priority Data

Mar. 5, 2008 (EP) .................................... 08004093

(51) Int. Cl.
*F24J 2/34* (2006.01)

(52) U.S. Cl. ........ 126/617; 126/563; 126/620; 126/655; 126/663

(58) Field of Classification Search .................. 126/563, 126/620, 655, 663, 617; 165/DIG. 471
See application file for complete search history.

(56) References Cited

U.S. PATENT DOCUMENTS

| 2,529,154 | A | * | 11/1950 | Hammond et al. | 126/620 |
| 2,689,090 | A | * | 9/1954 | Wetherbee et al. | 126/584 |
| 4,062,489 | A | * | 12/1977 | Henderson | 237/1 R |
| 4,111,259 | A | * | 9/1978 | Lebduska | 237/1 R |
| 4,169,491 | A | * | 10/1979 | Bajka | 137/625.47 |
| 4,169,554 | A | * | 10/1979 | Camp | 126/610 |
| 4,226,604 | A | * | 10/1980 | Weis | 62/197 |
| 4,248,049 | A | * | 2/1981 | Briley | 62/235.1 |
| 4,308,042 | A | * | 12/1981 | Ecker | 62/82 |
| 4,361,135 | A | * | 11/1982 | Metz | 126/640 |
| 4,375,806 | A | * | 3/1983 | Nishman | 126/585 |
| 4,378,908 | A | * | 4/1983 | Wood | 237/2 B |
| 4,381,764 | A | * | 5/1983 | Wojcik | 126/624 |
| 4,434,785 | A | * | 3/1984 | Knudsen | 126/400 |
| 4,577,435 | A | * | 3/1986 | Springer et al. | 47/2 |
| 4,787,444 | A | * | 11/1988 | Countryman | 165/48.2 |
| 4,823,771 | A | * | 4/1989 | Menning | 126/563 |
| 5,224,357 | A | * | 7/1993 | Galiyano et al. | 62/260 |
| 5,758,514 | A | * | 6/1998 | Genung et al. | 62/471 |
| 5,941,238 | A | * | 8/1999 | Tracy | 126/641 |
| 6,220,339 | B1 | * | 4/2001 | Krecke | 165/48.2 |
| 7,555,897 | B2 | * | 7/2009 | Alekseevich et al. | 60/398 |
| 2004/0035141 | A1 | * | 2/2004 | Schmidt | 62/434 |
| 2004/0194916 | A1 | | 10/2004 | Kim | 165/47 |
| 2007/0151704 | A1 | * | 7/2007 | Elmore | 165/45 |
| 2009/0139513 | A1 | * | 6/2009 | Davis | 126/615 |
| 2009/0277203 | A1 | * | 11/2009 | Dupraz | 62/238.7 |
| 2010/0154785 | A1 | * | 6/2010 | Hulen | 126/623 |

FOREIGN PATENT DOCUMENTS

| DE | 102004052638 | | 5/2006 |
| DE | 202007013089 | | 1/2008 |
| FR | 2505990 A | * | 11/1982 |
| WO | WO 8002736 | | 12/1980 |

* cited by examiner

*Primary Examiner* — Kenneth Rinehart
*Assistant Examiner* — Jorge Pereiro
(74) *Attorney, Agent, or Firm* — Andrew Wilford (57) ABSTRACT

A liquid-heating system has a solar energy collector exposed to solar radiation, a geothermal heat exchanger buried in the ground at a depth between 0.5 m and 5 m, a heater through which a liquid to be heated passes, and a heat pump having a sink side connected to the heater and a source side connected to the geothermal heat exchanger or to the solar energy collector. A first controller or valve setup connected to the heat collector can in one position connect the solar energy collector to the water heater such that heat collected by the solar energy collector is applied to the water heater. In another position it can connect the solar energy collector to the geothermal heat exchanger such that heat collected by the solar energy collector is applied to the ground surrounding the geothermal heat exchanger.

15 Claims, 6 Drawing Sheets

WATER-HEATING SYSTEM

FIELD OF THE INVENTION

The present invention relates to a heating system for water or another aqueous solution or mixture. More particularly this invention concerns combined geothermal and solar water heater.

BACKGROUND OF THE INVENTION

Most known water-heating systems are relatively inefficient and not environmental friendly. Furthermore, their installation is difficult and expensive.

OBJECTS OF THE INVENTION

It is therefore an object of the present invention to provide an improved water-heating system.

Another object is the provision of such an improved water-heating system that overcomes the above-given disadvantages, in particular that uses a combination of solar and geothermal power to heat water or an aqueous solution or mixture highly efficiently.

A further object is to provide such a system that is easy to manufacture, install, and maintain.

SUMMARY OF THE INVENTION

A liquid-heating system has according to the invention a solar energy collector exposed to solar radiation, a geothermal heat exchanger buried in the ground at a depth between 0.5 m and 5 m, a heater through which a liquid to be heated passes, and a heat pump having a sink side connected to the heater and a source side connected to the geothermal heat exchanger or to the solar energy collector. A first controller or valve setup connected to the heat collector can in one position connect the solar energy collector to the water heater such that heat collected by the solar energy collector is applied to the water heater. In another position it can connect the solar energy collector to the geothermal heat exchanger such that heat collected by the solar energy collector is applied to the ground surrounding the geothermal heat exchanger.

Furthermore according to the invention a second valve or controller setup is provided for, in one position, connecting the solar collector to the heat pump such that heat collected by the solar energy collector is applied to the heat pump, and, in another position, connecting the geothermal heat exchanger to the heat pump such that heat is extracted from the ground surrounding the geothermal heat exchanger and applied to the heat pump.

In other words the object of the invention is attained by a system for heating a fluid medium, particularly for heating water, and having at least one solar-energy heat collector, at least one geothermal heat exchanger, and at least one heat pump. The geothermal heat exchanger is sunk in the ground at a depth of 0.5 m up to 5 m. The water or other liquid to be heated is heated by the solar collector and/or the heat pump. A source side of the heat pump can be connected with the solar collector and/or with the geothermal heat exchanger. Furthermore heat from the solar collector can be fed into the geothermal heat exchanger such that the heat that is transported into the geothermal heat exchanger replaces the heat extracted by the heat pump from the geothermal heat exchanger at least partially or regenerates it.

It is within the scope of the invention to use water or brine (mixture water-antifreeze) as a liquid heat-exchange medium. To the extent the term "water" is used in the following, it also refers very generally to any liquid heat-exchange medium. To the extent in the above and in the following an arrangement of the geothermal heat exchanger at a depth is mentioned, depth refers to the distance from the upper side or upper edge of the geothermal heat exchanger, preferably the spacing between the upper side or upper edge of the heat-exchange elements described below.

The solar unit is provided with at least one solar collector and preferably a plurality of solar collectors in which a heat-exchange medium, preferably water or a mixture of water-antifreeze agent, is heated by solar radiation. Preferably, the solar collector is provided with a hermetically sealed or leak-proof housing. Advantageously, the heat-exchange medium that was heated in the solar collector is fed to a heat exchanger in which the heat of the heat-exchange medium is transferred to the water. It is recommended that the heat exchanger be located in a reservoir container and/or that it is a component of a heating system. Preferably, the heat obtained in the solar collector is used for heating water and/or for the heating a building.

The geothermal heat exchanger is designed as a register or distributor station that is provided with a container, a manifold and the register unit. According to the invention the geothermal heat exchanger is located at a frost-free depth in the ground. It is recommended that the geothermal heat exchanger be set below the surface of the earth at least 0.6 m, preferred at least 0.8 m and preferably at least 1.0 m. According to a preferred embodiment of the invention, the geothermal heat exchanger is located at a depth of between 0.5 m and 4.0 m, it is recommended between 0.5 m and 3.5 m, advantageously between 0.6 to 3.0 m, preferred between 0.7 m and 2.5 m and preferably between 0.8 m and 2.0 m. According to the invention that in the geothermal heat exchanger, the heat-exchange medium is warmed or tempered to the temperature of the ground. Further, The heat-exchange medium can be transported from the geothermal heat exchanger to the heat pump.

It is possible with intensive or sufficient solar radiation that the water be heated solely by the heat generated by the solar collector that is transferred to the heat-exchange medium. In this case, operation of the heat pump is not required. According to the invention a direct connection can be established between the solar collector and the heat pump, with nothing else in the closed fluid-circulation loop. It is recommended that the solar collector be directly connected with the heat pump when the heat that can be transferred by the solar collector to the heat carrier is insufficient for heating the water to a specified temperature. According to one embodiment of the invention, the heat-exchange medium is fed from the solar collector to the heat pump as long as the temperature of the heat-exchange medium conveyed to the heat pump by the solar collector is higher or equal to the temperature of the heat-exchange medium that can be transported from the geothermal heat exchanger to the heat pump. It is recommended that the heat-exchange medium be transported from the geothermal heat exchanger to the heat pump when the temperature of the heat-exchange medium transported by the solar collector is below the temperature of the heat-exchange medium flowing through the unit using geothermal energy. According to the invention in this case the ground is cooled down. According to the invention, the heat-exchange medium of the solar collector can be fed to the geothermal heat exchanger so that the temperature reduction of the ground as a result of extraction of the heat by the carrier medium is at least compensated in part and preferably compensated completely.

The container of the register station serves as reservoir for the heat-exchange medium that was heated in the solar collector or heated by solar heat, preferably water. In this case, the solar yield of the solar collector is used for increasing the temperature of the heat-exchange medium or a storage medium.

It is recommended that a system in accordance with the invention is provided with a solar collector, a geothermal heat exchanger, the heat pump and the heat exchanger as a closed system. The heat-exchange medium then circulates in this closed system.

The geothermal heat exchanger is provided with at least one register or distributor station that contains at least one register unit and preferably a number of or many register units. Advantageously, the heat-exchange medium flows through the register station as well as also the register unit.

According to one embodiment of the invention, a majority or a number of tube arrays or register units are set in a star array around the register station, that is extending radially outward from the central register/distributor station. It is then recommended that the register station located in the middle be equipped with register units or register arms. But it is also possible that the register units are positioned in a different geometric shape and that the central register station is attached.

Preferably, the register station is made of plastic, at least for the most part. The register station is made completely or essentially completely of plastic. According to the preferred embodiment, the register station is designed as leak-proof plastic container.

It is recommended that the register station be provided with at least one manifold, which manifold is controllable with the requirement that the heat-exchange medium can be conveyed to at least one register unit. The manifold be provided with at least one inlet and at least one outlet for the heat-exchange medium. It is recommended that the manifold be controlled in such a way that the heat-exchange medium is preferably conveyed to two, and preferably to a majority or to many register units.

Advantageously, in regeneration mode, the inlet of the manifold is connected with an outlet of the solar collector. In this way, the heat-exchange medium that is heated in the solar collector is conveyed to the manifold in the register station. It is recommended that the manifold form a connection between the inlet of the manifold and at least one register unit so that the heated heat-exchange medium flows into at least one register unit. It is thereby within the scope of the invention that the heated heat-exchange medium in the register unit releases the heat absorbed in the solar collector to the ground surrounding the register unit. As a result, the temperature of the ground surrounding the register unit increases. The heat-exchange medium that is cooled by the ground flows through the register unit back to the manifold, whereby conveniently the outlet of the manifold is connected with the inlet of the solar collector. Thus in regeneration mode unneeded energy collected by the solar collector is stored or banked in the soil or ground in which the geothermal exchanger is buried.

According to one embodiment of the invention, in production mode, the heat that is stored in the heat-exchange medium is transferred to the water that is to be heated. Advantageously, in production mode, the solar collector and/or the inlet of the manifold is connected with the feed line of the heat pump or on the side of the source with the heat pump. The heat-exchange medium, which is at the temperature or approximately the temperature of the ground can then be fed by the input line to the manifold to the feed line of the heat pump. The heat-exchange medium that is cooled down by the heat extraction in the heat pump flows through the outflow of the heat pump to the outlet of the manifold which manifold conveys the cooled heat-exchange medium to at least one register unit and preferably to a majority of the register units of the geothermal unit. The cooled heat-exchange medium advantageously absorbs the heat stored in the ground in the register units and can then be fed to the heat pump anew. The heat imparted to the ground in the regeneration mode regenerates the amount of heat removed in production mode at least partially, or preferably completely. It is possible that more heat energy is transported into the ground in regeneration mode than is removed from the ground in production mode.

Advantageously, a register unit is located in a plane or essentially in a plane. According to one embodiment, the plane is horizontally or essentially horizontally oriented. It is also possible that the plane is vertical or essentially vertically oriented. When a majority or many register units are attached to the register station it is possible that some of the register units are located on a horizontal or essentially horizontal plane and some of the register units are located on a vertical or essentially vertical plane.

In a preferred embodiment, the register station is provided with at least one register unit that is located essentially on horizontal planes and whereby a register unit—as a result of redirection—is located vertically above one another so that the redirection of at least one register unit is oriented parallel or at least essentially parallel to one another. Advantageously, the redirections of at least one register unit are located given the requirement that a gap is built between them. According to one embodiment, the gap is filled with a filling material, for example, soil or sand. It is possible, to align the register units by plane vertically and parallel or essentially parallel to one another, as well as to build a gap between the individual units. It is recommended that the gap located between neighboring register units be filled with filling material.

Advantageously, a register unit is provided with at least one heat exchanger, whereby the heat exchanger is formed by at least one pipe. It is recommended that a register unit be provided with two and preferably more or a number of heat exchangers. According to one embodiment of the invention, the pipe that forms the heat exchanger is made of plastic. It is recommended that the at least one heat exchanger or the majority or many of the heat exchangers are located on one plane.

Preferably, the pipe is held in the ground by at least one retaining element. According to one embodiment, the retaining element is designed as a clip or post having at least one receptacle or seat for the pipe. Advantageously, the clip or the post is provided with at least one notch or slot, in which the pipe is retained on the retainer element. According to one variation of an embodiment, the pipes of a heat exchanger and/or several heat exchangers are kept distant from one another in at least one clip. It is recommended that the distance between the pipes is thereby held constant or essentially constant.

According to an embodiment of the invention, the pipe is affixed at the retention element by at least one fixing element. Preferably, a fixing sleeve is used as a fixing element. Mounting the fixing element at the retention element requires that the pipe is permanently held in the receptacle or notch of the retainer element.

The invention also relates to a system for heating a fluid medium, preferably water, particularly for heating water, whereby the system is provided with at least one geothermal heat exchanger and at least one heat pump. The geothermal heat exchanger is sunk in the ground at a depth of 0.5 m and 5 m. The water can be heated by the heat pump that itself is connected with the geothermal heat exchanger at the source so that heat generated by the geothermal heat exchanger can be transported to the heat pump. For the remainder, the preferred embodiments that were described above of the geothermal heat exchanger or the aggregate of the geothermal heat exchanger and the heat pump, also apply to this system in accordance with the invention.

The invention is based on the recognition that with the system in accordance to the invention, water can be heated very effectively or with a surprisingly low energy requirement. It is important in this invention that the system in accordance with the invention makes functionally safe and optimal utilization of solar energy and energy that is stored in the ground possible. As a result of reliable regeneration of geothermal energy or compensation for heat extracted from the ground, the geothermal heat exchanger in accordance with the invention in combination with the solar collector in accordance with the invention allows a temperature increase of the heat-exchange medium, particularly in the feed line of the heat pump. As a result of this temperature increase, operation of the heat pump with a significantly higher degree of effectiveness is possible compared to prior art.

Furthermore, the invention is based on the knowledge that making a unit for utilizing geothermal energy available in accordance with the invention requires only a small amount of work in the ground. The geothermal heat exchanger in accordance with the invention requires only relatively little space. As a result installation of the system in accordance with the invention as compared to systems from prior art can be performed more cost effectively. It has also been shown that as a result of fixed positioning of the pipes or register units in accordance with the invention, quick and safe mounting of the register units is possible in the retainer elements. This design of the system contributes to cost reduction during installation as well.

Because the arrangement of the solar collector according to a particularly preferred embodiment is equipped with a leak-proof housing, the temperature of the heat-exchange medium in the solar collector is noncritical. Namely, it is possible to cool the temperature of the heat-exchange medium flowing into the solar collector to below the temperature of the ambient atmosphere of the solar collector.

In this way, the usable amount of heat that is stored in the heat-exchange medium is increased further. The problem known from prior art that water condensing in the solar collector leads to a decrease in the degree of effectiveness and causes corrosion problems is overcome by the invention in an easy way. Moreover, the geothermal heat exchanger offers the possibility, as a result of redirecting the direction of transport of the heat-exchange medium, that the system is usable for cooling, for example, of a building.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
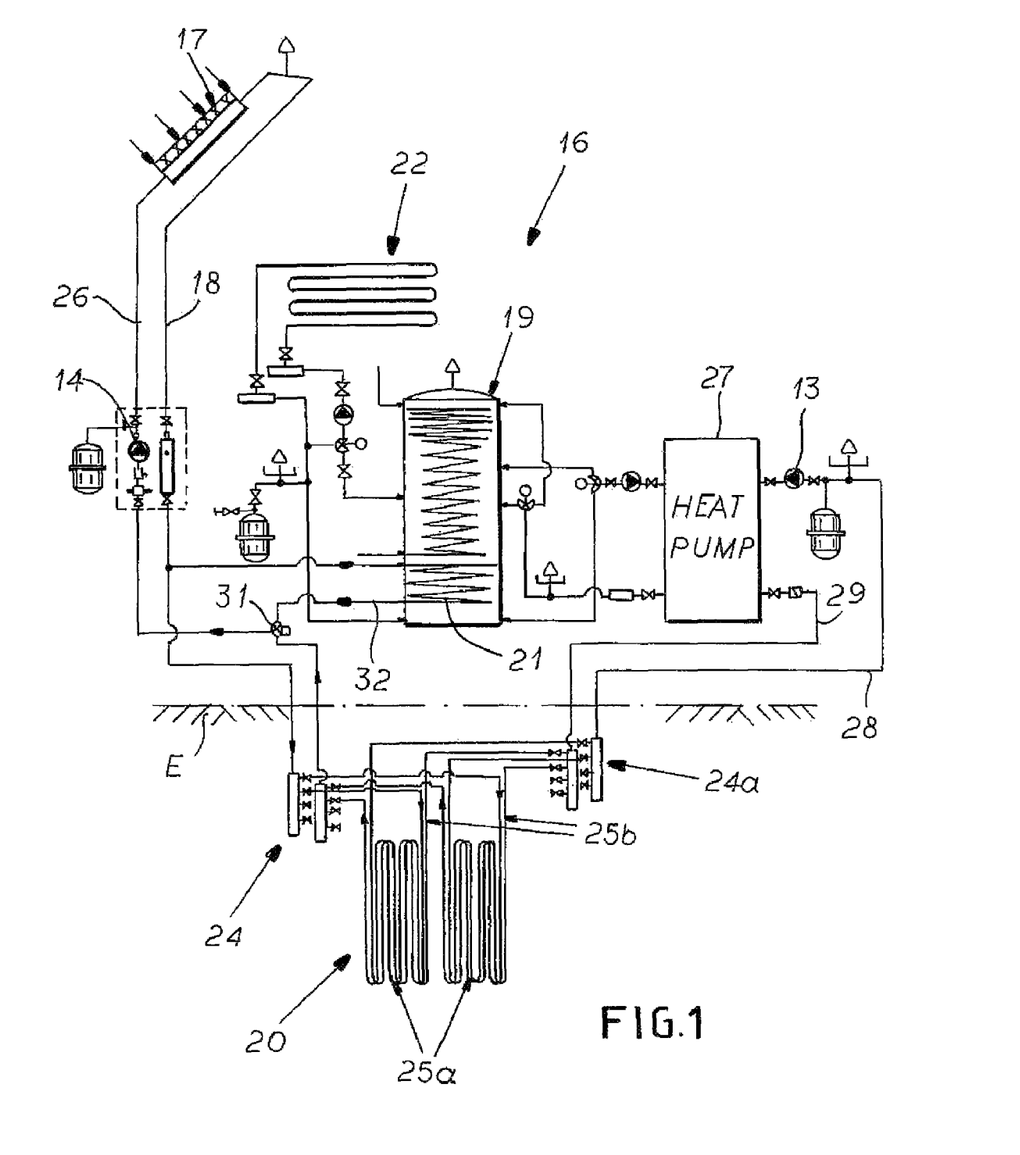
FIG. 1 is a schematic diagram of a first embodiment of the water-heating system according to the invention.

As seen in FIG. 1 a system 16 has a solar collector 17 where a heat-exchange medium, typically a liquid, is warmed and then fed by a supply line 18 through a primary manifold 24 to two underground primary heat exchange units 25a of a geothermal-energy unit 20. In this way, the heat transferred by the solar collector 17 to the heat-exchange medium is transported into the geothermal heat exchanger 20 and transferred to the ground E. The heat-exchange medium that is cooled by the ground E is fed back through the primary manifold 24 through a three-way valve 31 to a return line 26 and flows through the return line 26 back to the solar collector 17. A pump 14 in the line 26 ensures one way-flow through the collector 17, from the return line 26 to the feed line 18.

Furthermore, a heat-exchange coil 21 in a water heater 19 is connected to the supply line 18 so that heat transferred to the heat-exchange medium in the solar collector 17 can be transferred to the water that is to be heated in the tank heater 19. The heat-exchange medium that is cooled by this heat-exchange process is fed from the coil 21 back via a line 32 and the three-way valve 31 to the return line 26 and thence back to the solar collector 17. Thus, depending on the setting of the three-way valve 31, the liquid from the solar collector's lines 18 and 26 can be moved by the pump 14 either through the coil 21 of the water heater 19 or through the geothermal heat exchangers 25a.

In addition, two secondary heat exchangers 25b provided in the geothermal heat exchanger 20 in close proximity to the exchangers 25a are connected to a secondary manifold 24a. Via a secondary heat-exchange medium, the heat transported into the ground E or the heat that is stored in the ground E is fed by a supply line 28 from the manifold 24a to a source side of a heat pump 27 whose opposite sink side is connected to the water heater 19, so that the heat of the secondary-heat exchange medium can be applied to the water in the heater 19. The secondary heat-exchange medium that is cooled by the heat exchange process is fed from the source side from the heat pump 27 by a return line 29 back to the secondary manifold 24a and thence to the secondary heat exchangers 25b. Thus the lines 28 and 29, the source side of the heat pump 27, and the heat exchangers 25b form a closed loop for the second heat-exchange liquid. Another pump 13 ensures one-way flow through this loop, up the line 28 to the heat pump 27 and down the line 29 to the geothermal heat-storing unit 20.

The heated water that is held in the water heater 19 is used, for example, as hot water for standard household or industrial purposes, or in a heating system 22.

Figure 2:
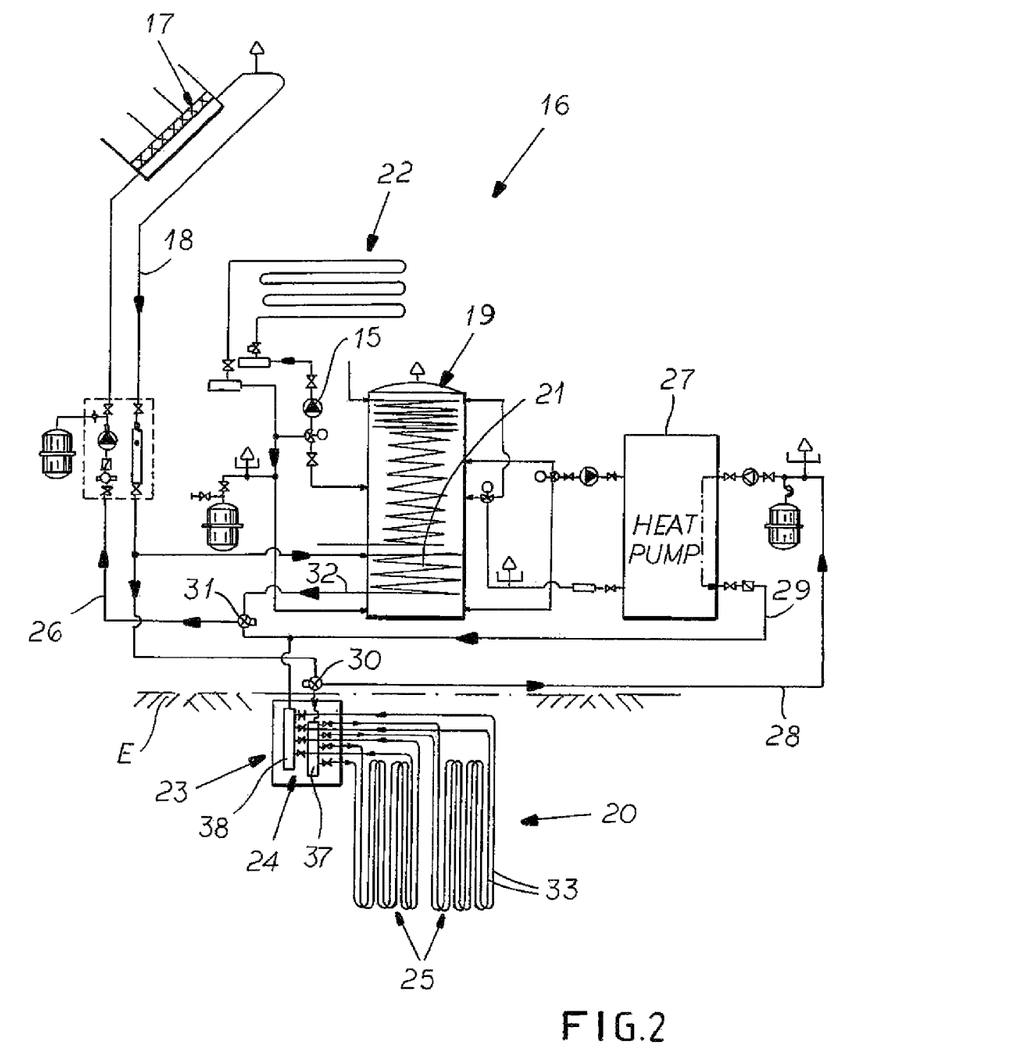
FIG. 2 is a schematic diagram of a second embodiment of the system in accordance with the invention.

In FIG. 2 a second embodiment of the system 16 according to the invention for heating water, particularly for preparing hot water and for supporting a building heating system is shown. The heat-exchange medium heated in the solar collector 17 is fed by the supply line 18 to the water heater 19 and/or to the geothermal heat exchanger 20 as in FIG. 1. Thus the heat that is transferred to the heat-exchange medium in the solar collector 17 can be transferred to the water that is to be heated in a the heat-exchange coil 21 located in the water heater 19. The heated water which is held in the water heater 19 is used, for example, for operating and/or supporting a heating system 22 and/or a—not shown—supply system for heated industrial water. The heat system 22 has a pump 15 that can circulate water or another heat-exchange liquid through the tank heater 19 and through the heat system 22.

In addition, the heated heat-exchange medium according to FIG. 2 can be fed from the collector 17 as in FIG. 1 to the geothermal unit 20 via the supply line 18. In a station 23, in the embodiment according to FIG. 2, a manifold 24 is provided with which the heat-exchange medium is distributed to two register units with four interleaved heat exchangers 25. The heat-exchange medium flows through the heat exchangers 25 and is transported to the manifold 24 that is mounted in the station 23, from which the heat-exchange medium flows back via the return line 26 to the solar collector 17.

Advantageously in the embodiment of FIG. 2, the heat-exchange coil 21 in the water heater 19 is also connected to the return line 26 so that the cooled heat-exchange medium in the heat-exchange coil 21 can be conveyed back to this return line 26.

Here, unlike FIG. 1, the supply line 18 is also connected to the heat pump 27 by the line 28. The heat pump 27, transfers heat that is stored in the heat-exchange medium to the water that is to be heated in the water heater 19 so that the heat-exchange medium is cooled and can be transported through the return line 29 to the geothermal heat exchanger 20 and/or the solar collector 17. Preferably and in the embodiment of FIG. 2, the return line 29 is connected to the return line 26. FIG. 2 shows a three-way valve 30 at the connection at which the supply line 18 is connected to the geothermal heat exchanger 20 and the input line 28.

In production mode when there is abundant sunshine, the heat-exchange medium that is heated by the solar collector 17 is conveyed to the heat-exchange coil 21 that is mounted in the water heater 19 so that the water in the heater 19 is heated. This takes place advantageously as shown in FIG. 2 until the water in the water heater 19 has reached a specified set-point temperature.

If heating to the specific set-point temperature is not possible, for example, because of insufficient solar radiation, the heat-exchange medium is fed to the heat pump 27 after flowing through the solar collector 17 via the supply line 18 and input line 28. Supplying the heat pump 27 with heat-exchange medium heated by the solar collector 17 takes place so that the heat-exchange medium leaving the solar collector 17 has a higher temperature or a higher heat content than the heat-exchange medium in the geothermal heat exchanger 20. According to FIG. 2, the heat-exchange medium in the heat pump 27 is cooled and passes through the return line 29 and the return line 26 back to the solar collector 17. As a result, the three-way valves 30 and 31 form a flow path in which the solar collector 17 is connected directly across the source side of the heat pump 27. In the embodiment of FIG. 2, the energy stored in the heat-exchange medium is transferred to the water in the water heater 19 by the heat pump 27 whose sink side is connected to the heater 19.

Preferably as shown in FIG. 2, the three-way valves 30 and 31 are set such that a flow path with the geothermal heat exchanger 20 connected to the heat pump 27 is formed when the temperature of the heat-exchange medium that was heated by the solar collector 17 is lower than the temperature of the heat-exchange medium that is in the geothermal heat exchanger 20. The heat-exchange medium first flows through the manifold 24 in the register station 23, is then fed to the input line 28 via the valve 30, and finally flows from there to the heat pump 27. After transferring the energy stored in the heat-exchange medium to the water in the water heater 19, the cooled heat-exchange medium flows back to the station 23 via return line 29 and manifold 24. Preferably, and according to the embodiment of FIG. 2, the heat-exchange medium is fed to the heat exchangers 25 by the manifold 24, whereby the heat-exchange medium absorbs the heat stored in the ground E when flowing through the heat exchangers 25 and is again transported to the heat pump 27 via the input line 28.

Further, FIG. 2 shows that the heat-exchange medium that can be heated by the solar collector 17 can be fed directly to the geothermal heat exchanger 20. The heat-exchange medium is transported in regeneration mode from the solar collector 17 to the geothermal heat exchanger 20 when the amount of heat stored in the heat-exchange medium is larger than the heat that can be extracted by the heat-exchange coil 21 and/or by the heat pump 27. In other words, the heat-exchange medium is transported by the solar collector 17 to the geothermal heat exchanger 20 when—relative to the heat requirement—excess heat is stored in the heat-exchange medium. Thus as shown in FIG. 2, the heat-exchange medium is directed by the valve 30 into the station 23 and the manifold 24, and is thence fed to the heat exchangers 25 by the manifold 24. As a result, the heat stored in the heat-exchange medium is transferred to the ground E. As soon as the heat stored in the heat-exchange medium is needed for heating water, a switch is made from the regenerating mode to the production mode. In this way all of the heat collected by the solar collector 17 is used, to directly heat water in the heater 19, and/or to operate the heat pump 27, and/or to heat the ground surrounding the geothermal unit 20.

Figure 3:
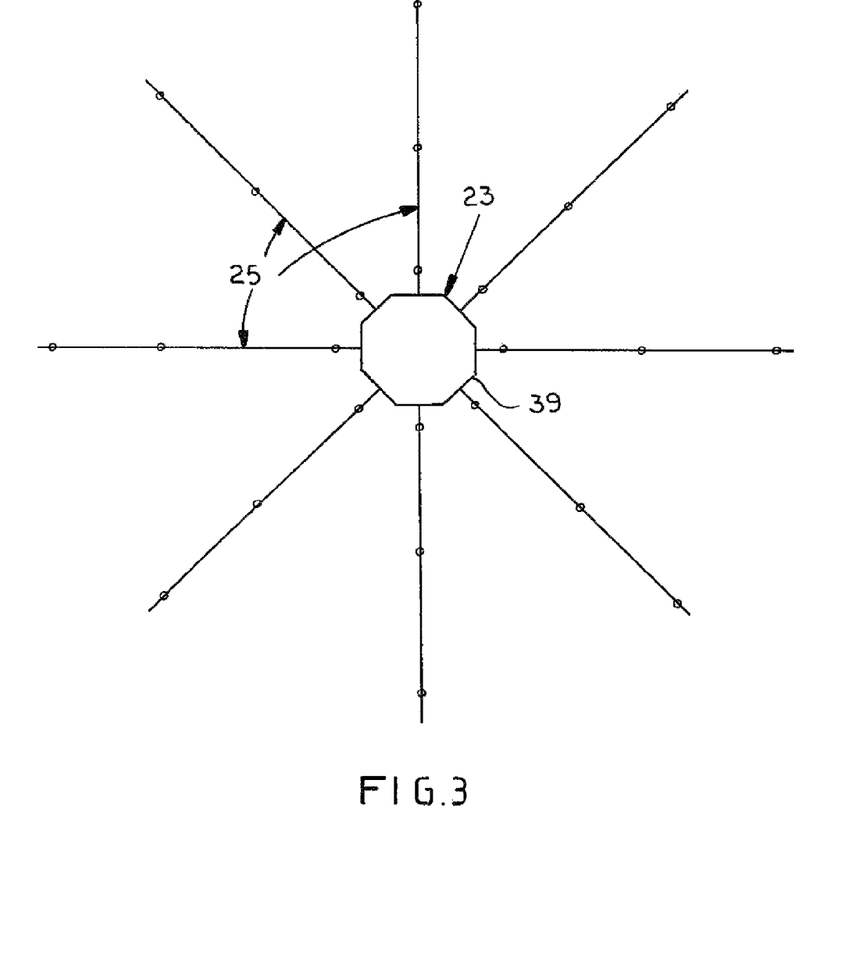
FIG. 3 is a top view of a first embodiment of a geothermal unit according to the invention.

FIG. 3 shows a geothermal heat exchanger in accordance with the invention which has a central station 23, to which eight of the heat exchangers 25 are attached. The manifold 24 is located in the station 23, but is not shown in FIG. 3. Advantageously, and according to the embodiment of FIG. 3, the housing in the station 23 consists of a plastic container 39. Furthermore, FIG. 3 shows that the station 23 is located centrally or in the middle of the heat exchangers 25 that extend radially outward from a vertical central axis of the station 23. Preferably, the heat exchangers 25 have a length of approximately 10 m. Within the scope of the invention, length refers to the horizontal elongation of the units or heat exchangers 25 parallel to the surface of the ground. Furthermore, the units or heat exchangers 25 are themselves oriented vertically or perpendicular to the surface of the ground E.

Figure 4:
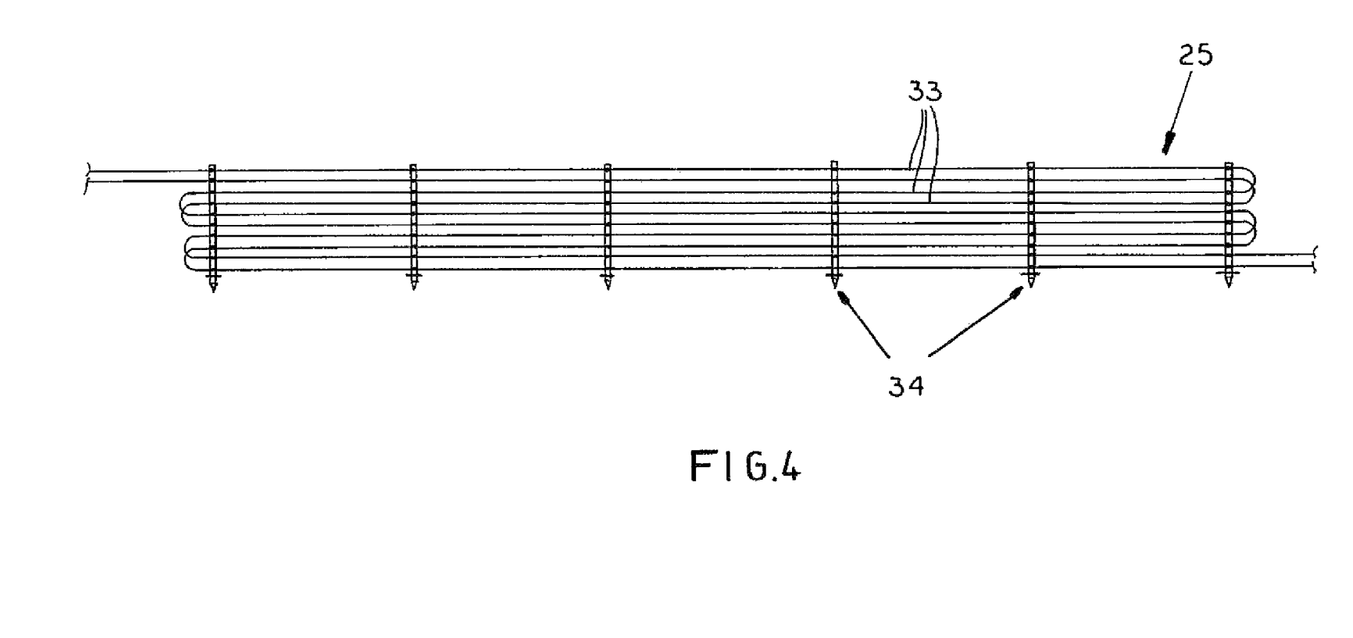
FIG. 4 is a side view of one of the tube arrays or registers of the unit of FIG. 3.

FIG. 4 shows a side view of one of the heat exchangers 25. The heat exchanger 25 is formed by pipes 33 through which heat-exchange medium flows and which are held one above-the other by clips 34.

Figure 5:
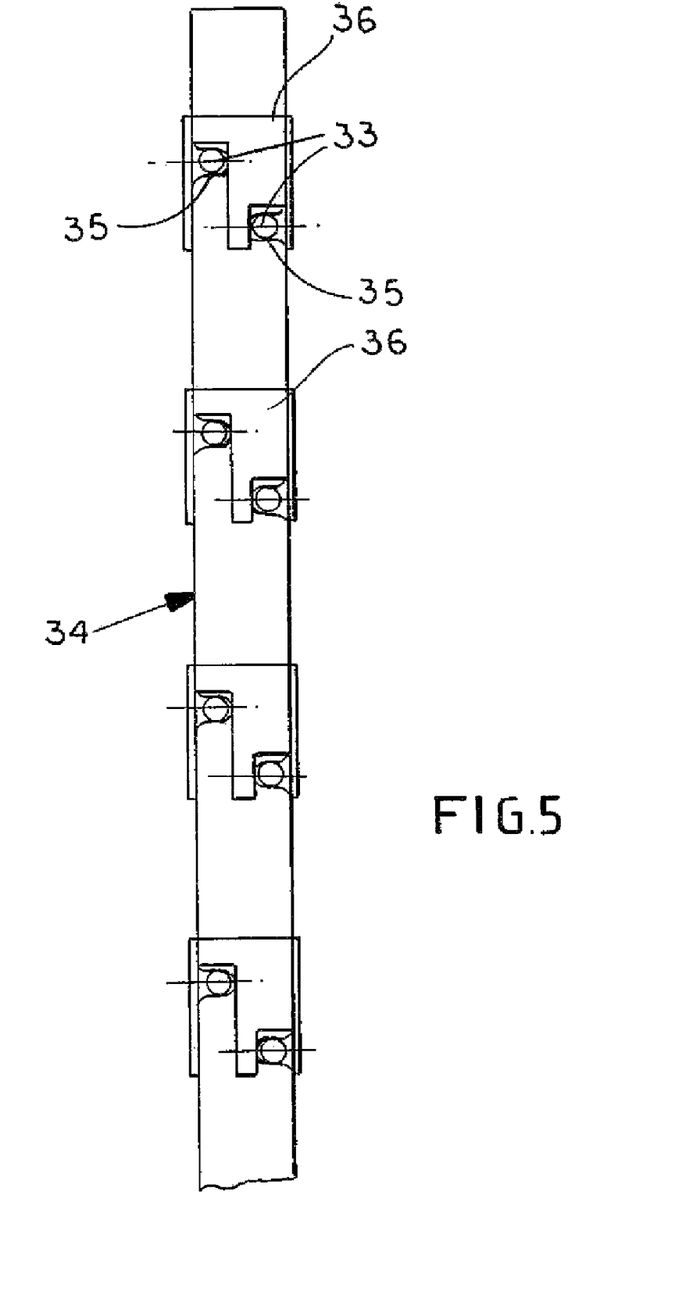
FIG. 5 is a vertical section through the tube array of FIG. 4.

FIG. 5 shows a section of a clip 34 in which notches or slots 35 are located into which pipes 33 are formed. Further, FIG. 5 shows that the pipes 33 are secured against falling out of slots 35 in the clips 34 by fixing sleeves 36. The pipes 33 forming the heat exchanger are each retained by a plurality of clips 34.

Figure 6:
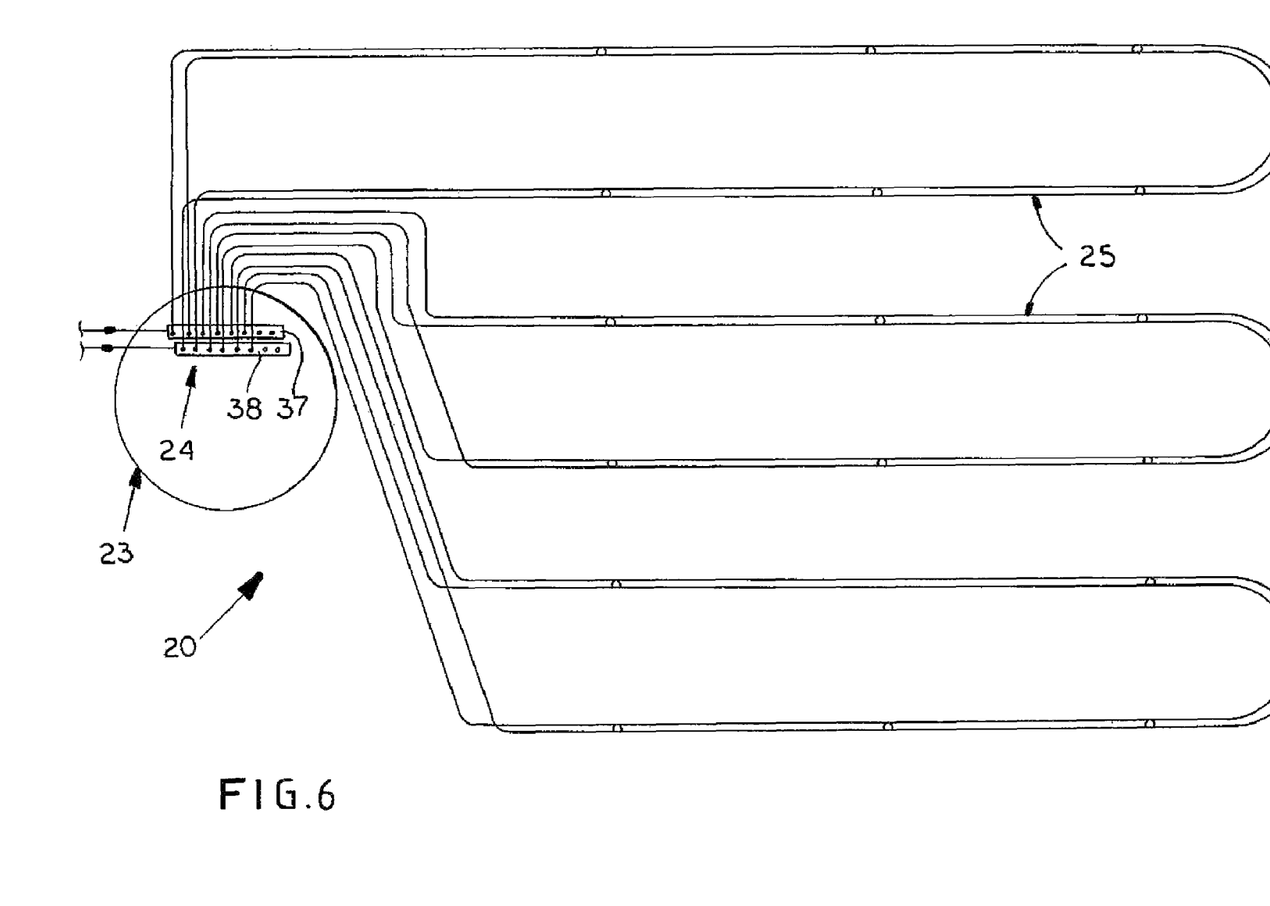
FIG. 6 is a top view of another geothermal unit in accordance with the invention.

In FIG. 6, a further embodiment of a geothermal heat exchanger 20 is shown whose heat exchangers 25 are U-shaped, the arms of the U-profiles being parallel to each another. FIGS. 2 and 6 show in particular that the units or heat exchangers 25 are fed heat-exchange medium by a supply unit 37 of the manifold 24. Further, the heat exchangers 25 are connected to a drain unit 38 of manifold 24 and through this drain unit 38, the heat-exchange medium that has been heated by the ground E can be fed to the heat pump 27, for example.

We claim:
1. A liquid-heating system comprising:
a solar energy collector exposed to solar radiation;
a geothermal heat exchanger buried in the ground at a depth between 0.5 m and 5 m;
a heater through which a liquid to be heated passes;

a heat pump having a sink side connected to the heater and a source side connected to the geothermal heat exchanger or to the collector; and first valve means connected to the collector, the exchanger, and the heater for in one position connecting the collector to the heater such that heat collected by the collector is applied to the heater, and in another position connecting the collector to the geothermal heat exchanger such that heat collected by the collector is applied to the ground surrounding the geothermal heat exchanger;

second valve means connected to the collector, to the geothermal heat exchanger, and to the source side of the heat pump for in one position connecting the collector to the heat pump such that heat collected by the collector is applied to the heat pump, and in another position connecting the geothermal heat exchanger to the heat pump such that heat is extracted from the ground surrounding the geothermal heat exchanger and applied to the heat pump;

a distributor in the collector for storing the heat-exchange medium of the collector;

a first set of tubes connectable to the collector; and a second set of tubes connectable to the source side of the heat pump, both sets of tubes surrounding and extending radially and horizontally from the distributor.

2. A liquid-heating system comprising:

a solar energy collector exposed to solar radiation;

a geothermal heat exchanger buried in the ground at a depth between 0.5 m and 5 m;

a heater through which a liquid to be heated passes;

a heat pump having a sink side connected to the heater and a source side connected to the heat exchanger or to the collector;

first valve means connected to the collector, the heat exchanger, and the heater for:

in one position connecting the collector to the heater such that heat collected by the collector is applied to the heater, and in another position connecting the collector to the heat exchanger such that heat collected by the collector is applied to the ground surrounding the heat exchanger;

second valve means connected to the collector, to the heat exchanger, and to the source side of the heat pump for:

in one position connecting the collector to the heat pump such that heat collected by the collector is applied to the heat pump, and in another position connecting the heat exchanger to the heat pump such that heat is extracted from the ground surrounding the geothermal heat exchanger and applied to the heat pump;

a distributor set in the ground, holding the valve means, and forming part of the geothermal heat exchanger;

a first set of tubes set in the ground and connectable to the collector; and a second set of tubes set in the ground and connectable to the source side of the heat pump, both sets of tubes surrounding the distributor and extending radially and horizontally therefrom.

3. The liquid-heating system comprising:

a solar energy collector exposed to solar radiation;

a geothermal heat exchanger buried in the ground at a depth between 0.5 m and 5 m;

a heater through which a liquid to be heated passes;

a heat pump having a sink side connected to the heater and a source side connected to the geothermal heat exchanger or to the collector; and first valve means connected to the collector, the exchanger, and the heater for:

in one position connecting the collector to the heater such that heat collected by the collector is applied to the heater, and in another position connecting the collector to the geothermal heat exchanger such that heat collected by the collector is applied to the ground surrounding the geothermal heat exchanger;

a distributor in the heat exchanger;

a first set of tubes connectable to the collector; and a second set of tubes connectable to the source side of the heat pump, both sets of tubes lying in a plane and surrounding the distributor, each set of tubes having at least one clip holding the tubes at a spacing generally parallel to one another and formed with seats for the respective tubes, each tube being provided with at least one element holding the respective tubes in the respective seats.

4. The liquid-heating system defined in claim 3, further comprising second valve means connected to the collector, heat exchanger, and to the source side of the heat pump for in one position connecting the collector to the heat pump such that heat collected by the collector is applied to the heat pump, and in another position connecting the geothermal heat exchanger to the heat pump such that heat is extracted from the ground surrounding the heat exchanger and applied to the heat pump.

5. The liquid-heating system defined in claim 3 wherein the geothermal heat exchanger includes a distributor;

a first set of tubes connectable to the collector; and a second set of tubes connectable to the source side of the heat pump.

6. The liquid-heating system defined in claim 5 wherein the distributor is sent in the ground outside and is surrounded by the sets of tubes.

7. The liquid-heating system defined in claim 6 wherein the distributor has a plastic housing.

8. The liquid-heating system defined in claim 6 wherein the sets of tubes extend radially and horizontally from the distributor.

9. The liquid-heating system defined in claim 8 wherein the distributor holds the valve means.

10. The liquid-heating system defined in claim 8 wherein the distributor stores the heat-exchange medium of the collector.

11. The liquid-heating system defined in claim 5 wherein each set of tubes lies in a plane.

12. The liquid-heating system defined in claim 11 wherein the planes are horizontal.

13. The liquid-heating system defined in claim 11 wherein the planes are vertical.

14. The liquid-heating system defined in claim 11 wherein each set of tubes has at least one clip holding the tubes at a spacing generally parallel to one another.

15. The liquid-heating system defined in claim 14 wherein each clip is formed with seats for the respective tubes.

* * * * *